(12) United States Patent
Zhao et al.

(10) Patent No.: US 12,147,027 B2
(45) Date of Patent: Nov. 19, 2024

(54) FULL-COLOR REVERSIBLE SWITCHING DEVICE CONTROLLED BY ELECTROCHEMISTRY, AND ITS PREPARATION METHOD AND USE

(71) Applicant: SUZHOU INSTITUTE OF NANO-TECH AND NANO-BIONICS (SINANO), CHINESE ACADEMY OF SCIENCES, Suzhou (CN)

(72) Inventors: Zhigang Zhao, Suzhou (CN); Xueqing Tang, Suzhou (CN); Zishou Hu, Suzhou (CN); Shan Cong, Suzhou (CN)

(73) Assignee: SUZHOU INSTITUTE OF NANO-TECH AND NANO-BIONICS (SINANO), CHINESE ACADEMY OF SCIENCES, Suzhou (CN)

(*) Notice: Subject to any disclaimer, the term of this patent is extended or adjusted under 35 U.S.C. 154(b) by 0 days.

(21) Appl. No.: 18/578,313

(22) PCT Filed: Apr. 7, 2023

(86) PCT No.: PCT/CN2023/086918
§ 371 (c)(1),
(2) Date: Jan. 11, 2024

(87) PCT Pub. No.: WO2024/164424
PCT Pub. Date: Aug. 15, 2024

(65) Prior Publication Data
US 2024/0264426 A1    Aug. 8, 2024

(30) Foreign Application Priority Data
Feb. 8, 2023  (CN) .......................... 202310087178.3

(51) Int. Cl.
*G02B 26/00* (2006.01)

(52) U.S. Cl.
CPC .................................. *G02B 26/001* (2013.01)

(58) Field of Classification Search
CPC ..................................................... G02B 26/001
(Continued)

(56) References Cited

U.S. PATENT DOCUMENTS

| 5,253,100 A | * | 10/1993 | Yang ................... G02F 1/15165 359/266 |
| 2011/0013254 A1 | | 1/2011 | Widjaja et al. |

(Continued)

FOREIGN PATENT DOCUMENTS

| CN | 1426543 A | 6/2003 |
| CN | 109988551 A | 7/2019 |

(Continued)

*Primary Examiner* — Tuyen Tra
(74) *Attorney, Agent, or Firm* — Bayramoglu Law Offices LLC

(57) ABSTRACT

A full-color reversible switching device controlled by electrochemistry, and its preparation method and use are provided. The device controlled by electrochemistry includes a color-changing layer, an electrolyte and a counter electrode. The color-changing layer includes a substrate, a conductive layer and an active material layer. The active material layer and the conductive layer form a physical interference color. The electrolyte is connected to the conductive layer or the active material layer. When an electrochemical reaction occurs between the electrolyte and a surface of the conductive layer or the active material layer, the thickness of the active material layer changes. The device controlled by electrochemistry has rich tunable colors that can cover the entire color gamut, and can achieve reversible switching of colors at a small voltage.

20 Claims, 5 Drawing Sheets

(58) Field of Classification Search
USPC .................................................. 359/265–275
See application file for complete search history.

(56) References Cited

U.S. PATENT DOCUMENTS

2014/0168746 A1    6/2014  Yamamoto et al.
2021/0013551 A1*   1/2021  Zhi ....................... H01M 10/38

FOREIGN PATENT DOCUMENTS

| CN | 111624829 A | 9/2020 |
| CN | 112117442 A | 12/2020 |
| CN | 112180648 A | 1/2021 |
| CN | 112826183 A | 5/2021 |
| CN | 113296328 A | 8/2021 |
| CN | 115407574 A | 11/2022 |

\* cited by examiner

FULL-COLOR REVERSIBLE SWITCHING DEVICE CONTROLLED BY ELECTROCHEMISTRY, AND ITS PREPARATION METHOD AND USE

CROSS-REFERENCE TO THE RELATED APPLICATIONS

This application is the national phase entry of International Application No. PCT/CN2023/086918, filed on Apr. 7, 2023, which is based upon and claims priority to Chinese Patent Application No. 202310087178.3, filed on Feb. 8, 2023, the entire contents of which are incorporated herein by reference.

TECHNICAL FIELD

The present application relates to the field of optical technology, and in particular to a full-color reversible switching device controlled by electrochemistry, and its preparation method and use.

BACKGROUND

With the development of the times and the advancement of science and technology, electronic displays have penetrated our daily lives. Therefore, the energy-saving technology of electronic display screens appears to be particularly important in green environmental protection projects.

For traditional electronic display devices, for example LED or more traditional liquid crystal, rear-projection displays, etc., continuous power must be utilized to maintain the display of patterns or colors. Once the supply of power is lost, the capability of displaying patterns or colors will be lost in a short period of time.

However, for some fields that do not require dynamic display of patterns or colors, e.g. billboards, signboards, etc., the switching of patterns or colors of them is infrequent, and it has been always necessary to consume electrical energy to maintain the display of patterns or colors, obviously producing a lot of unnecessary energy consumption, which is not conducive to the sustainable development of green environmental protection.

Some prior art tries to solve the aforementioned problems. For example, some prior art represented by Chinese invention patent CN1426543A provide a certain electrodeposition display device, which can realize electrically-regulated changes of patterns and colors, and after the color changes, there is no need to continue to consume electrical energy to maintain patterns or colors. However, some of the technical solutions provided by these prior arts can only achieve pattern changes in black and white, or changes in a single or a few colors, and cannot realize multi-color regulation in a wide color gamut. Their essence is still a pattern display device, rather than a multi-color regulation device.

For example, in some other existing technical solutions represented by Chinese invention patents CN113296328A or CN112117442A, film layers having multiple basic colors can be obtained only through film layer design, and then the color and/or transparency of the film layer are appropriately adjusted by applying voltage. The color change is still near the basic colors, or is just a change in brightness or transparency, or even just a change in color temperature. Its essence is still upper and lower local adjustment around the basic colors, and it is impossible to achieve comprehensive adjustment in a wide color gamut on a single material.

In summary, the electrically-regulated color-changing structures or devices provided by the prior art cannot meet the current color display needs for diversification and wide color gamut adjustment in electronic displays, and the application results are not ideal.

SUMMARY

In view of the shortcomings of the prior art, an objective of the present application is to provide a full-color reversible switching device controlled by electrochemistry, and its preparation method and use.

In order to achieve the aforementioned objectives of the present disclosure, the technical solution adopted by the present application includes the following ones.

In a first aspect, the present application provides a full-color reversible switching device controlled by electrochemistry, including a color-changing layer and an electrolyte.

The color-changing layer includes a substrate, a conductive layer and an active material layer, and the active material layer and the conductive layer form physical interference to obtain a structural color.

The electrolyte is connected to the conductive layer or the active material layer, and when an electrochemical reaction occurs between the electrolyte and a surface of the conductive layer or the active material layer, the thickness of the active material layer changes.

In a second aspect, the present application further provides a method for preparing a device controlled by electrochemistry, including:
  forming a conductive layer on a substrate;
  Bringing an electrolyte into contact with the conductive layer, and forming an active material layer between the electrolyte and the conductive layer through electrochemical deposition to constitute the device controlled by electrochemistry;
  or alternatively, forming an active material layer on a surface of the conductive layer, and then bringing the electrolyte into contact with the active material layer to constitute the device controlled by electrochemistry,
  wherein, when a reaction occurs between the electrolyte and the surface of the conductive layer or the active material layer, the thickness of the active material layer changes.

Based on the aforementioned technical solution, compared with the prior art, the beneficial effects of the present application at least include:
  the device controlled by electrochemistry provided by the present application has rich tunable colors that can cover the entire color gamut, and can achieve reversible switching of colors at a small voltage, with a voltage window less than 6 V; and moreover, the device controlled by electrochemistry provided by the present application has memory characteristics of the regulated colors, does not require additional energy input to maintain the colors, is energy-saving and environmentally friendly, and has the characteristics of high brightness and high saturation, thereby having broad application prospects in energy-saving display, decoration, anti-counterfeiting, batteries and the like fields.

The aforementioned description is only an overview of the technical solution of the present application. In order to enable those skilled in the art to understand the technical means of the present application more clearly and implement them in accordance with the contents of the specification, the following describes the preferred embodiments of the present application in conjunction with the detailed description of the drawings hereafter.

DETAILED DESCRIPTION OF THE EMBODIMENTS

Figure 1:
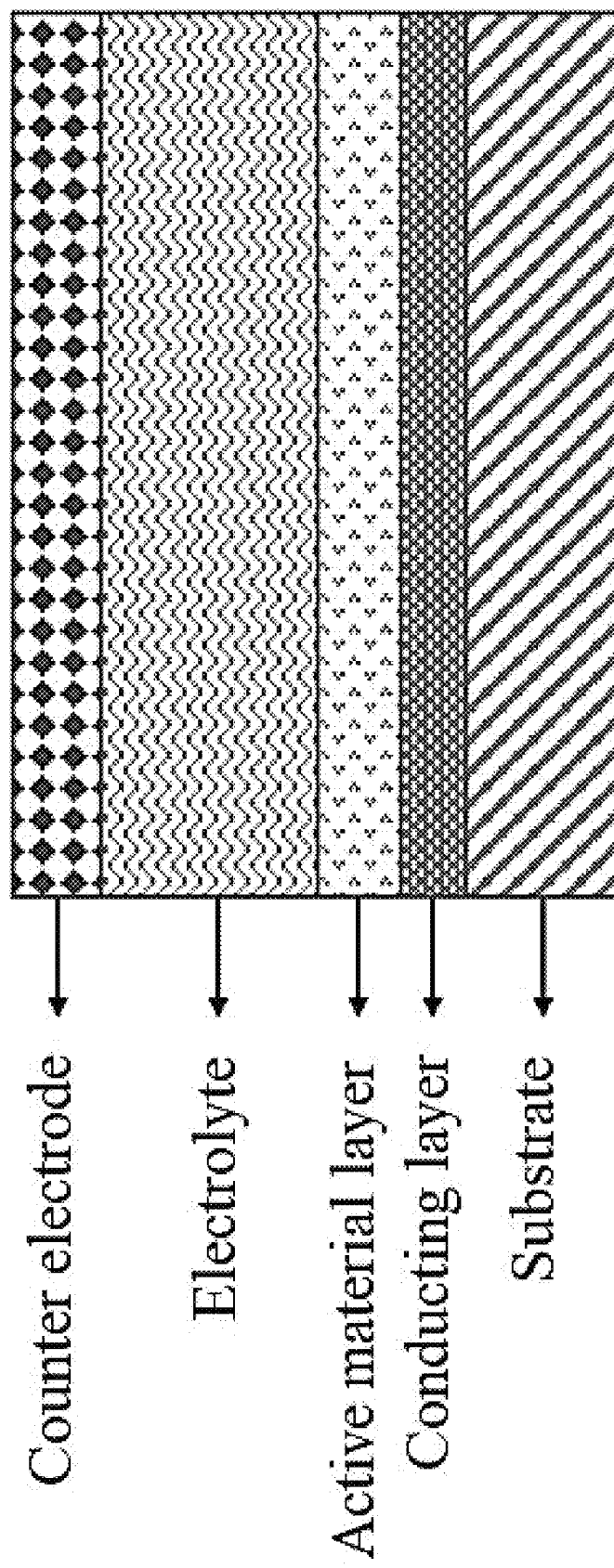
FIG. 1 is a schematic structural diagram of a device controlled by electrochemistry provided in a typical embodiment of the present application.

In view of the deficiencies in the prior art, the inventor of the present disclosure is able to propose the technical solution of the present application after long-term research and extensive practice. The technical solution, and an implementation process and principles thereof will be further explained below.

Many specific details are set forth in the following description to fully understand the present application. However, the present application can also be implemented in other ways other than those described herein. Therefore, the protection scope of the present application is not limited to the specific examples disclosed hereafter.

The present application provides a method for preparing a device that realizes reversible switching of multiple colors through electrical regulation. It is suitable for various static display scenes and achieves switching among multiple colors by externally applying a small voltage. Due to its memory retention characteristics, it does not require additional energy to maintain long-term display, which not only meets people's demand for colors, but also achieves the purpose of energy saving.

Thus, the embodiments of the present application provide a full-color reversible switching device controlled by electrochemistry, including a color-changing layer and an electrolyte. The color-changing layer includes a substrate, a conductive layer, and an active material layer. The active material layer and the conductive layer form a physical interference color. The electrolyte is connected to the conductive layer or the active material layer, and when an electrochemical reaction occurs between the electrolyte and the surface of the conductive layer or active material layer, the thickness of the active material layer changes.

Some prior art provides technical solutions such as electrochromic electrodes that make voltage response based on electrochromic materials, but they all perform voltage-responsive color regulation based on the color-changing principle of metal ion intercalation/de-intercalation, so as to achieve the indicated function. However, such a color-changing principle is still local adjustment based on the basic colors of the electrochromic material itself. Even though these prior arts achieve a variety of basic colors through film layer design, the subsequent electrochromic range is not broad and thus it cannot achieve diverse color changes on one device.

The present application creatively adopts electro-induced thickness regulation to directly change the interference parameters of an optical interference structure, thereby enabling electrically controlled color changes in a full color gamut on one device. The main electrical control conditions on which the present application is based are: the time of voltage application, or the amount of electricity passed through an electrolysis reaction, which is the most direct variable that determines a thickness parameter, rather than regulating the intercalation and de-intercalation trends of ions based on voltage as in the prior art.

In some embodiments, the device controlled by electrochemistry can further include a counter electrode electrically connected to the electrolyte. For convenience of application, the counter electrode may be provided in the device, or alternatively the counter electrode may not be included and instead may be further connected to an electrolyte solution through some electrodes or electrical contact components during use.

Figure 2:
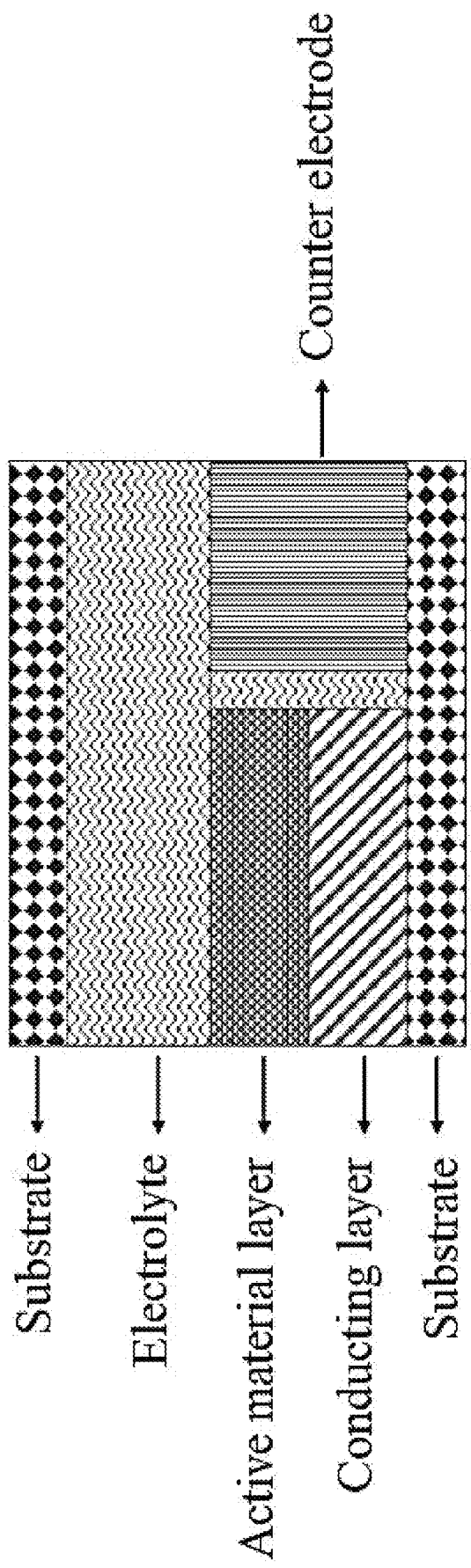
FIG. 2 is a schematic structural diagram of a device controlled by electrochemistry provided by another typical embodiment of the present application.

In some embodiments, as shown in FIG. 1 the counter electrode and the color-changing layer can be stacked in a thickness direction, or as shown in FIG. 2 the counter electrode and the color-changing layer can be arranged side by side in a width direction; when they are arranged side by side, also called "arranged shoulder to shoulder", at this time, some non-transparent counter electrodes can be adopted. On one hand, the selection range of counter electrodes is expanded. On the other hand, denser and more stable electrodes, for example bulk metal or carbon materials, etc., can often be selected as non-transparent counter electrodes, which can achieve a more stable device structure.

In some embodiments, the counter electrode is transparent or translucent, which is preferred mainly in order to realize the stacked arrangement of the counter electrode and the color-changing layer as shown in FIG. 1, and for example is a metal mesh or a metal film, which also belongs to transparent or translucent materials.

The material of the counter electrode includes but is not limited to: metal (e.g., Zn, Ag, Cu, Au, Fe, Ti, V, Pt, W, Pd, etc.), oxides, nitrides, sulfides, carbon materials (e.g., carbon cloth, carbon fiber, carbon nanotube films, graphene films, etc.), conductive polymers, etc.

The substrate can be glass, organic glass, plastic products, fibers, carbon material films, cloth, wooden boards, ceramics or metal alloys, building exterior walls, etc. In the present application, there is no specific restriction on the material of the substrate, as long as it can effectively load the conductive layer.

In some embodiments, a plurality of cations are included in the electrolyte.

In some embodiments, at least two non-ferrous metal ions are included in the electrolyte.

In some embodiments, the cations in the electrolyte include any one or a combination of two or more of $H^+$, $Li^+$, $Al^{3+}$, $Na^+$, $K^+$, $Rb^+$, $Ag^+$, $Ni^{2+}$, $Ca^{2+}$, $Mo^{6+}$, $Mn^{2+}$, $Ti^{4+}$, $V^{4+}$, $Zn^{2+}$, $W^{6+}$, $Ta^{5+}$, $Cu^{2+}$, $Bi^{3+}$, $Sn^{4+}$, $Mg^{2+}$, $Cs^+$, but are not limited to the cation range listed above.

Preferably, the electrolyte may preferably contain a zinc salt compound.

In some embodiments, the zinc salt compound may include for example any one or a combination of two or more of $Zn(ClO_4)_2$, $Zn(NO_3)_2$, $ZnSO_4$, $ZnCl_2$ or $Zn(Ac)_2$.

In some embodiments, the electrolyte may be in a liquid, gel or solid state.

Specifically, the solute in the electrolyte can be, for example, a compound of $H^+$, $Li^+$, $Al^{3+}$, $Na^+$, $K^+$, $Rb^+$, $Ag^+$, $Ni^{2+}$, $Ca^{2+}$, $Mo^{6+}$, $Mn^{2+}$, $Ti^{4+}$, $V^{4+}$, $Zn^{2+}$, $W^{6+}$, $Ta^{5+}$, $Cu^{2+}$, $Bi^{3+}$, $Sn^{4+}$, $Mg^{2+}$ or $Cs^+$. In one embodiment, the electrolyte layer may include a zinc salt compound, e.g., $Zn(ClO_4)_2$, $Zn(NO_3)_2$, $ZnSO_4$, $ZnCl_2$ or $Zn(Ac)_2$. Depending on the polarity of the applied voltage, the ions contained in the electrolyte can be intercalated and de-intercalated from the color-changing layer, or subjected to deposition and dissolution phenomena, thereby contributing to the color-changing or light transmittance change of the device. In some embodiments, the adopted electrolyte contains a mixture of multiple ions, which can make the color change of the device richer and fuller and have better stability than a single ion.

In some embodiments, the material of the active material layer includes any one or a combination of two or more of metal oxides, metals, and polymers.

In some embodiments, the material of the active material layer includes any one or a combination of two or more of $ZnO$, $MnO_2$, $MoO_3$, $WO_3$, $Fe_3O_4$, $Fe_2O_3$, $NiO$, $VO_2$, $V_2O_5$, $TiO_2$, $CuO$, $Cu_2O$, $Al_2O_3$, $Ta_2O_5$, $Ag_2O$, $Ag$, $Cu$, $Al$, $Ni$, $Zn$, $Bi$, $Au$, $Pt$, polyaniline, polythiophene, and polypyrrole; and specifically, metal oxides, metal or polymers, etc., can be selected as the active material. For example, the active material includes but is not limited to $ZnO$, $MnO_2$, $MoO_3$, $WO_3$, $Fe_3O_4$, $Fe_2O_3$, $NiO$, $VO_2$, $V_2O_5$, $TiO_2$, $CuO$, $Cu_2O$, $Al_2O_3$, $Ta_2O_5$, $Ag_2O$, $Ag$, $Cu$, $Al$, $Ni$, $Zn$, $Bi$, $Au$, $Pt$, polyaniline, polythiophene, polypyrrole, etc.

Moreover, the active material layer may be one layer, for example, it may be formed directly from an electrolyte solution through an electrodeposition reaction. Specifically, it may be formed by plating one or more metals, especially non-ferrous metals, on the surface of a conductive layer. The active material layer formed in this manner is often a single layer. Alternatively, first a metal oxide can be deposited on the surface of the conductive layer as a seed layer (which can be regarded as a sub-layer of the active material layer), and then a layer of metal or polymer etc. can be electrodeposited through an electrolyte solution (constituting a second sub-layer), thereby obtaining an active material layer with a double-layer structure.

Therefore, in some possible embodiments, the active material layer may include a first sub-layer and a second sub-layer arranged in a stacked manner. The first sub-layer is closely connected to the conductive layer, and the first sub-layer may include the aforementioned metal oxide, and the second sub-layer may include the aforementioned metal and/or polymer. Since this embodiment has the seed layer, it has good electrodeposition uniformity, fine grains, faster color-changing response, and more stable color maintenance performance. Due to the existence of the seed layer, the growth process of the active material eliminates a nucleation stage and the growing starts directly, making its growth more uniform and faster, which in turn can bring about a faster color-changing response and more uniform full-color color-changing performance.

In some embodiments, the material of the conductive layer may include any one or a combination of two of metal and non-metal conductive materials, but is not limited thereto.

In some embodiments, the material of the conductive layer may include any one or a combination of two or more of Cu, Ag, W, Ti, V, Fe, Cr, Ni, Zn, Al, Mo, Au, Pd, Co, Ta, Pt, Mg, carbon materials, conductive metal oxides and conductive polymer materials, but is not limited thereto. Specifically, metal or other conductive materials can be selected as the conductive layer. The metal material includes but is not limited to Cu, Ag, W, Ti, V, Fe, Cr, Ni, Zn, Al, Mo, Au, Pd, Co, Ta, Pt, Mg, etc. The conductive material includes but is not limited to carbon materials (e.g., carbon cloth, carbon fibers, carbon nanotube films, graphene films, etc.), metal oxides (e.g., AZO, ITO, FTO), and other conductive polymer materials (e.g., polyaniline, polyacetylene), etc.

In some embodiments, the structure of the conductive layer is any one of a one-dimensional film, a two-dimensional photonic crystal, a three-dimensional photonic crystal or a nanoparticle.

In some embodiments, the thickness of the conductive layer can preferably be 0-1 cm, and in the following embodiments more preferably 50-1,000 nm.

In some embodiments, the structure of the active material layer may be any one of a one-dimensional film, a two-dimensional photonic crystal, a three-dimensional photonic crystal or a nanoparticle.

In some embodiments, the thickness of the active material layer is 0-1 mm, preferably 0-800 nm, and further preferably 0-200 nm. It should be noted that the thickness of the aforementioned active material layer may be 0. At this time, it can be understood that the active material layer does not exist yet. For example, in the following examples, when electrodeposition has not started after injection of the electrolyte solution, the device will still have the intrinsic color of the conductive layer, and is still within the scope of the device controlled by electrochemistry described in the present application, and it is not limited to the fact that the device belongs to the device of the present application only when an active material layer is formed therein. That is, whether the active material layer exists is related to the state of electrical regulation. In an initial state, or when it is reversibly restored to the initial state after cyclic color change, the active material layer may not exist (the device controlled by electrochemistry includes an optional active material layer), that is, its thickness is 0.

Correspondingly, a second aspect of the embodiments of the present application further provides a method for preparing a device controlled by electrochemistry, including the following steps:

forming a conductive layer on a substrate;

Bringing an electrolyte into contact with the conductive layer, and forming an active material layer between the electrolyte and the conductive layer through electrochemical deposition to constitute the device controlled by electrochemistry;

or alternatively, forming an active material layer on a surface of the conductive layer, and then bringing the electrolyte into contact with the active material layer to constitute the device controlled by electrochemistry, wherein, when a reaction occurs between the electrolyte and the surface of the conductive layer or the active material layer, the thickness of the active material layer changes.

As some typical embodiments of the aforementioned technical solutions, the preparation method provided in the present application can be implemented by using the following steps:

The color-changing layer is obtained by physical or chemical deposition, and a conductive layer is deposited on the substrate. The conductive layer may be metal, a metal oxide, nitride, sulfide, a carbon material or conductive polymer, and then optionally a layer of active material is covered on the conductive layer by physical or chemical deposition. At this time, the thickness of the active material layer can be selected between 0-800 nm.

The color-changing layer and the counter electrode are assembled in a face to face or side by side manner. Two electrodes are connected with an electrolyte therebetween. The electrolyte can be in a liquid, gel or solid form. The electrolyte can be a mixed electrolyte, for example a mixed electrolyte composed of two or more salts, such as aqueous $ZnCl_2$, $H_2SO_4$, $MnSO_4$, $MnCl_2$, $ZnSO_4$ and the like salts.

Through electrochemical means, an active material layer is deposited onto or dissolved from the conductive layer or color-changing layer. Different thicknesses of the active material layer correspond to different colors of the device, thereby obtaining a device with reversible switching of multiple colors.

A third aspect of the embodiments of the present application further provides a method for regulating a color of a device controlled by electrochemistry, including the following steps:
  providing the device controlled by electrochemistry provided by any of the aforementioned embodiments.
  applying a voltage between the conductive layer and the electrolyte, and allowing the device controlled by electrochemistry to present different colors by adjusting the application time of the applied voltage.

In some embodiments, the color regulation method further includes:
  applying a reverse voltage between the conductive layer and the electrolyte, so as to reversibly restore the color presented by the device controlled by electrochemistry.

In some embodiments, the applied voltage is below 6 V, and preferably 1.2-2 V.

In some embodiments, the application time is 0-160 s.

In some embodiments, by adjusting the application time, the color that can be presented by the device controlled by electrochemistry includes any one of red, orange, yellow, green, blue, indigo, and violet, thereby achieving full color. Of course, the full color referred to in the present application also refers to the ability of regulating to produce at least the aforementioned 7 colors in one device. This is a wide color gamut that cannot be achieved by local color change through color changes of electrochromic materials in the prior art.

A fourth aspect of the embodiments of the present application further provides use of the device controlled by electrochemistry provided by any of the aforementioned embodiments in any field of display, decoration, anti-counterfeiting, batteries, and energy-saving building materials.

The technical solution of the present application will be further described in detail below through several examples in conjunction with the accompanying drawings. However, the selected examples are merely illustrative of the present application and do not limit the scope of the present application.

Example 1

This example illustrated a device that achieved reversible switching of multiple colors through electrical regulation, including a color-changing layer (a substrate, a conductive layer, and an active material layer), an electrolyte, and a counter electrode layer. Its structure was shown in FIG. 1.

A method for preparing the device that achieved reversible switching of multiple colors through electrical regulation in this example was as follows: depositing a conductive layer on a clean PET plastic plate. Specifically, it was that: one layer of AZO film is sputtered by magnetron with a thickness set to be 200 nm; a transparent Cu metal grid was selected as the counter electrode; a liquid electrolyte was injected between the two electrodes, and the liquid electrolyte contained a plurality of cations: $Cu^{2+}$, $Mn^{2+}$, $H^+$, and $Bi^{3+}$; a working electrode (the conductive layer) and the counter electrode were connected to the two poles of an electrochemical workstation respectively. A given voltage, preferably set to be 1.2 V, was applied to the device for different times to form active materials on the conductive layer and different thicknesses of the active materials were regulated by controlling the application time of the voltage, thereby obtaining a device with a variety of color changes. Moreover, when an opposite current was applied, the color change could be reversibly restored according to the same rule. The device controlled by electrochemistry provided by the present application realized reversible switching of seven full colors in the same device by controlling the time of voltage application.

Of course, the aforementioned conductive AZO film could also be prepared by methods known in the art such as electron beam evaporation and thermal evaporation, and the achieved color change effect was the same.

Example 2

This example illustrated a device that achieved reversible switching of multiple colors through electrical regulation, including a color-changing layer (a substrate, a conductive layer, and an active material layer), an electrolyte, and a counter electrode layer, as shown in FIG. 1.

A method for preparing the device that achieved reversible switching of multiple colors through electrical regulation in this example was as follows: depositing a conductive layer on clean glass. Preferably, one layer of Au film was sputtered by magnetron with a thickness of 50 nm. ITO was selected as the counter electrode, and the thickness of transparent ITO was selected to be 200 nm. An electrolyte was injected between the two electrodes. PVA was added into the electrolyte as a skeleton to form a gel, and the PVA content was 20%. A working electrode and the counter electrode were connected to the two poles of an electrochemical workstation respectively. A given voltage, preferably set to be 2 V, was applied to the device for different times to obtain active materials of different thicknesses on the conductive layer, so as to obtain a device with multiple color changes, of which the color change range still covered seven full colors, and the color change was stable and reversible.

Of course, the aforementioned conductive Au and ITO films could also be prepared by methods known in the art such as electron beam evaporation and thermal evaporation, and the achieved color change effect was the same.

Example 3

This example illustrated a device that achieved reversible switching of multiple colors through electrical regulation, including a color-changing layer (a substrate, a conductive layer, and an active material layer), an electrolyte, and a counter electrode layer, as shown in FIG. 1.

A method for preparing the device that achieved reversible switching of multiple colors through electrical regulation in this example was as follows: depositing a conductive layer on a clean carbon nanotube film. Preferably, one layer of polyaniline film was screen printed with a thickness set to be 1 m; then one layer of $MnO_2$ was electrochemically deposited on the polyaniline film with a thickness of 100 nm as one of the active material layers; metal Zn, and preferably a transparent Zn metal grid was selected as the counter electrode; and a liquid electrolyte was injected between the two electrodes, and preferably, the liquid electrolyte contained a plurality of cations: $Zn^{2+}$, $Mn^{2+}$, $H^+$ and monomers, crosslinking agents, and photoinitiators for ultraviolet light curing to obtain a hydrogel electrolyte. A working electrode and the counter electrode were connected to the two poles of an electrochemical workstation respectively. A given voltage, preferably set to be 1.8 V, was applied to the device for different times to obtain active materials of different thicknesses on the conductive layer, so as to obtain a device with multiple color changes, of which the color change range still covered seven full colors, and the color change was stable and reversible.

Of course, the aforementioned conductive polyaniline film could also be prepared by methods known in the art such as electrochemical deposition, spin coating, etc., and the achieved color change effect was the same.

Moreover, the thicknesses of the deposited manganese dioxide in this example had a one-to-one correspondence relationship with the colors, and the corresponding color could be obtained by changing the deposited thickness. For example, a thickness of 130 nm corresponded to yellow, and a thickness of 210 nm corresponded to green, etc.

Example 4

This example illustrated a device that achieved reversible switching of multiple colors through electrical regulation, including a color-changing layer (a substrate, a conductive layer, and an active material layer), an electrolyte, and a counter electrode layer, which were assembled side by side to form the device, as shown in FIG. 2. The reflectance curves and optical photographs of a single device under different active material layer thicknesses could be seen in FIGS. 3 and 4.

Figure 3:
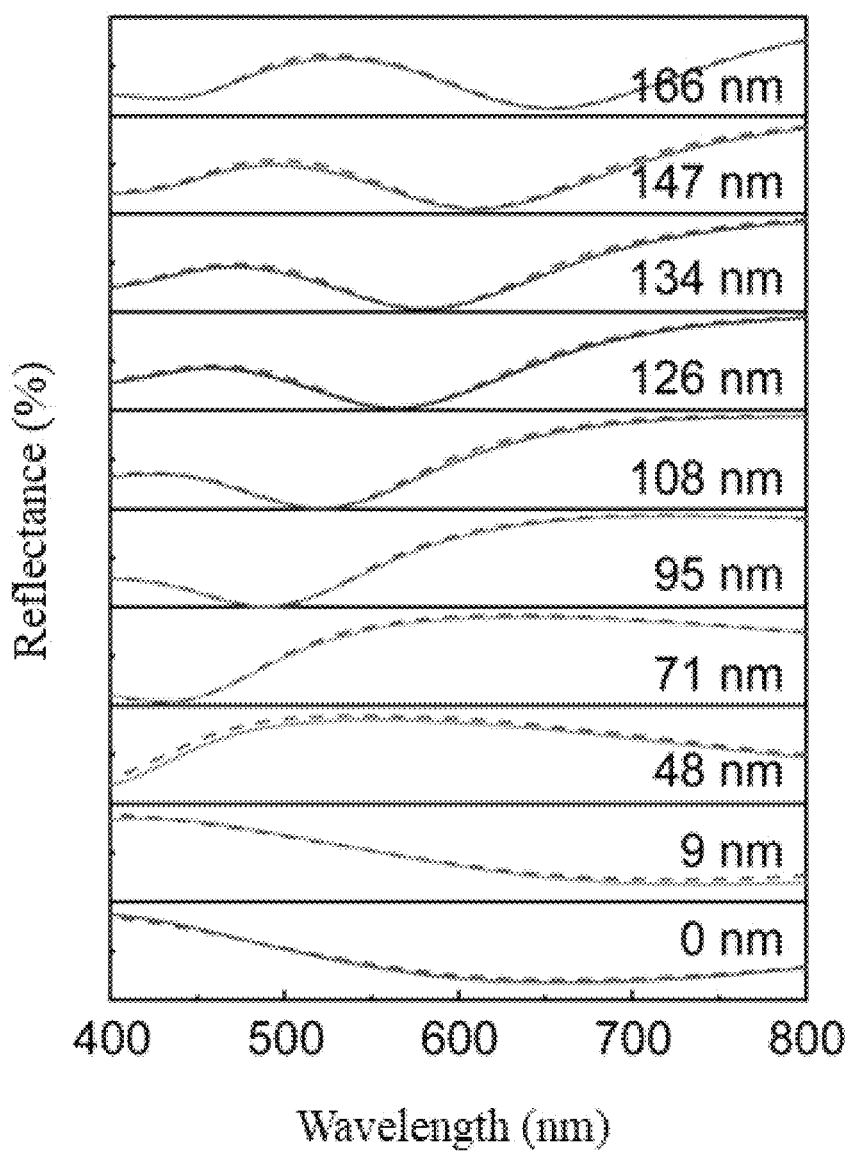
FIG. 3 is a graph showing a reflectance curve of a device controlled by electrochemistry provided in a typical embodiment of the present application, and a change rule of a thickness of an active material layer.
Figure 4:
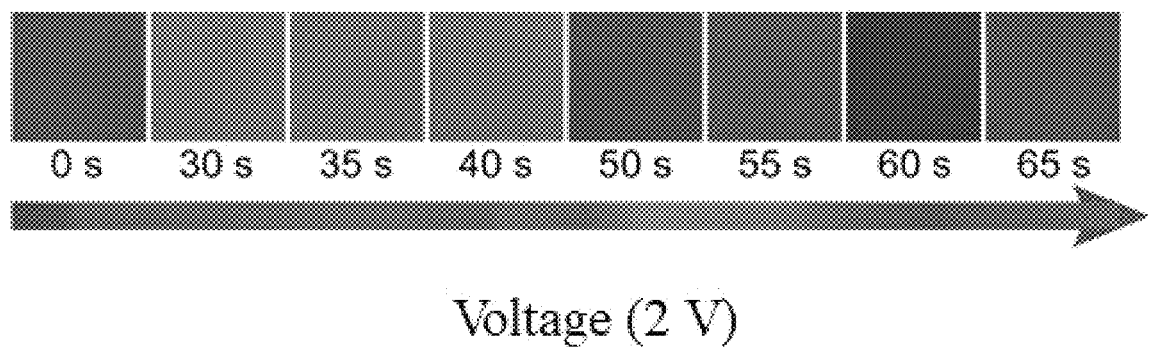
FIG. 4 is a photograph of an electrically-regulated color-changing process of the device controlled by electrochemistry provided in a typical embodiment of the present application.

A method for preparing the device that achieved reversible switching of multiple colors through electrical regulation in this example was as follows: depositing a conductive layer on a clean PET transparent film. Preferably, one layer of Pt was sputtered by magnetron with a preferred Pt thickness of 80 nm. A carbon nanotube film was selected as the counter electrode, and was assembled side by side into the device; a liquid electrolyte was injected between the two electrodes, and preferably, the liquid electrolyte contained a plurality of components: $Cr(NO_3)_3$, $MnCl_2$, HCl and monomers, crosslinking agents, and photoinitiators for ultraviolet light curing to obtain a hydrogel electrolyte. A working electrode and the counter electrode were connected to the two poles of an electrochemical workstation respectively. A given voltage, preferably set to be 1.8 V, was applied to the device for different times to obtain active materials of different thicknesses on the conductive layer, so as to obtain a device with multiple color changes. As shown in FIGS. 3 and 4, the thickness of a general active material layer could be 0-200 nm. In such a range, the color change range still covered seven full colors, and the color change was stable and reversible.

Of course, the aforementioned conductive Pt film could also be prepared by methods known in the art such as electron beam evaporation and thermal evaporation, and the achieved color change effect was the same.

Example 5

Figure 5:
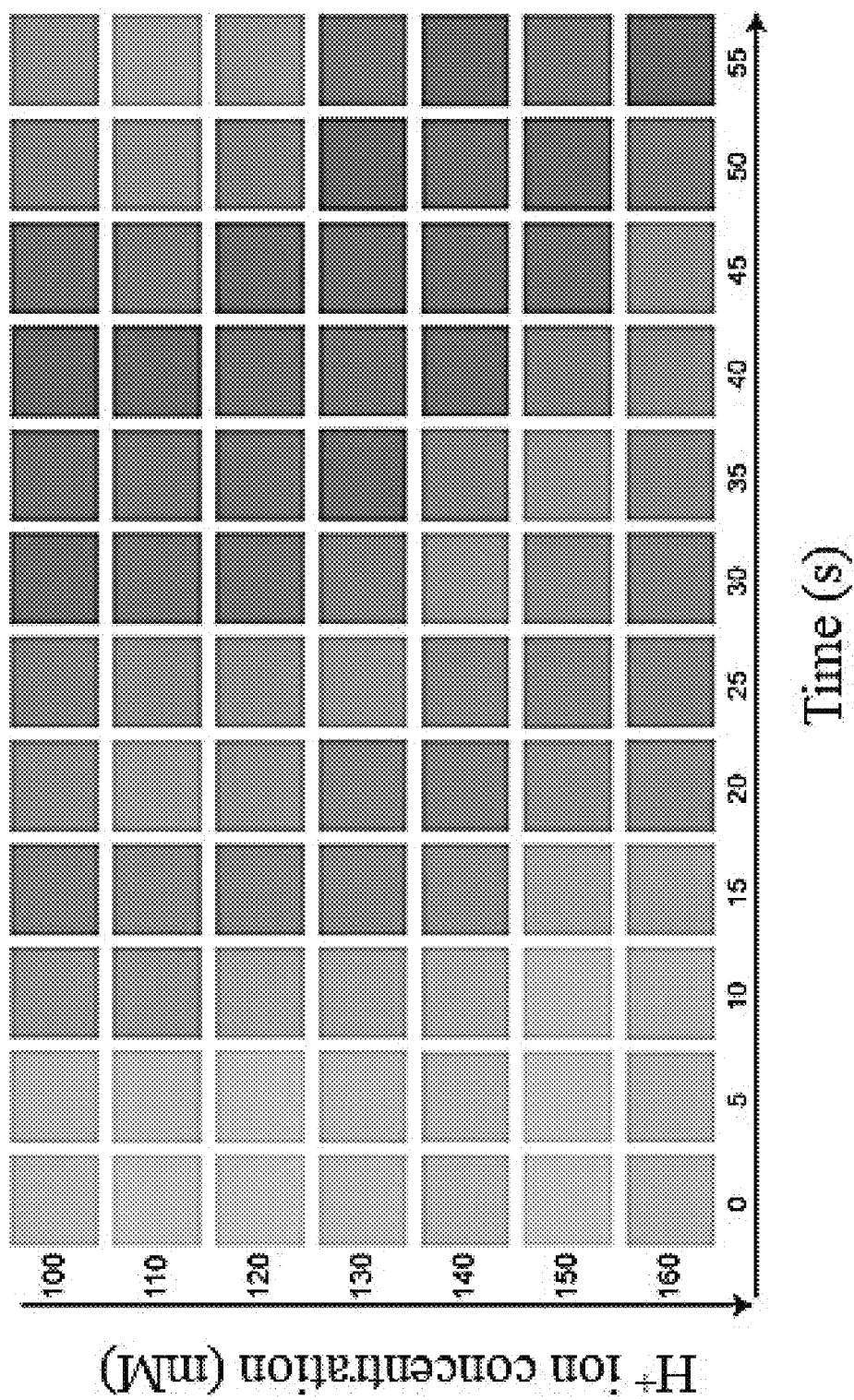
FIG. 5 is a photograph of an electrically-regulated color-changing rule of the device controlled by electrochemistry provided by another typical embodiment of the present application under different hydrogen ion concentrations.

This example illustrated a device that achieved reversible switching of multiple colors through electrical regulation, including a color-changing layer (a substrate, a conductive layer, and an active material layer), an electrolyte, and a counter electrode layer, which were assembled side by side to form the device, as shown in FIG. 2. Optical photographs of the single device under different $H^+$ concentrations could be seen in FIG. 5.

A method for preparing the device that achieved reversible switching of multiple colors through electrical regulation in this example was as follows: depositing a conductive layer on a clean PET transparent film. Preferably, one layer of ITO was sputtered by magnetron with a preferred ITO thickness of 200 nm. A carbon nanotube film was selected as the counter electrode, and was assembled side by side into the device; a liquid electrolyte was injected between the two electrodes, and preferably, the liquid electrolyte contained a plurality of components: $BiCl_3$, $ZnCl_2$, HCl and monomers, crosslinking agents, and photoinitiators for ultraviolet light curing to obtain a hydrogel electrolyte. A working electrode and the counter electrode were connected to the two poles of an electrochemical workstation respectively. A given voltage, preferably set to be 1.5 V, was applied to control the response time of color transition by changing the hydrogen ion concentration in the electrolyte of the device, and to obtain active materials of different thicknesses on the conductive layer, thereby obtaining a device with multiple color changes and meanwhile preparing a device with a variety of different hydrogen ions. The color-changing rule of the device was shown in FIG. 5. It could be seen that the hydrogen ion concentration in the range of 100-160 mM had no impact on whether full-color performance could be achieved, and it mainly affected the color-changing speed.

Of course, the aforementioned conductive ITO film could also be prepared by methods known in the art such as electron beam evaporation and thermal evaporation. The obtained color change effect and the rule in influence of the hydrogen ion concentration were the same.

Example 6

Figure 6:
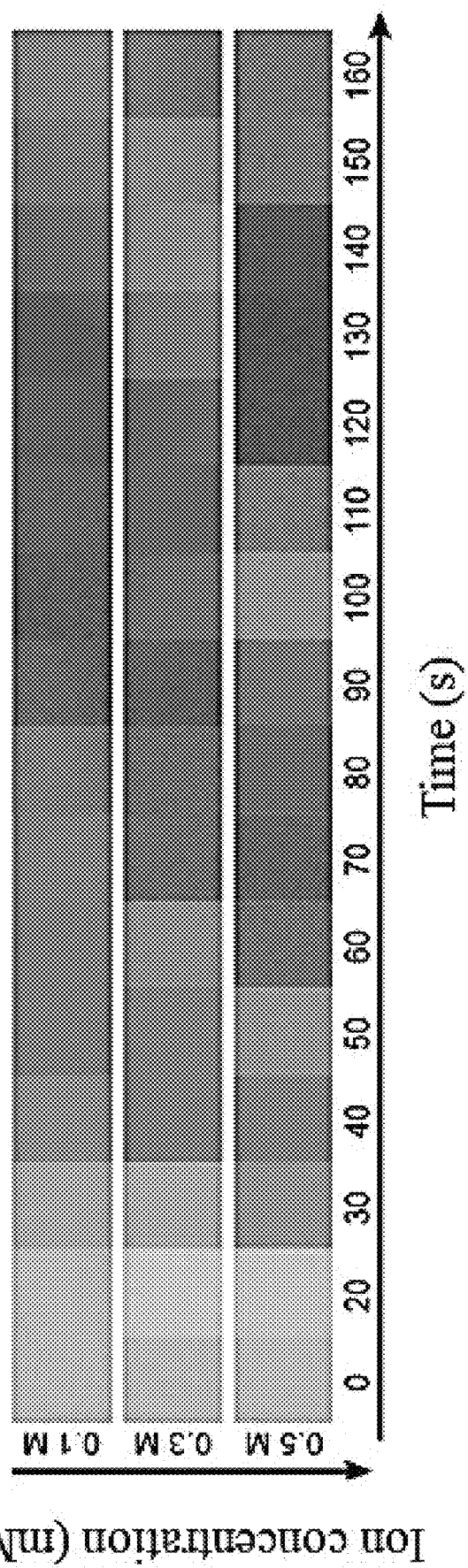
FIG. 6 is a photograph of an electrically-regulated color-changing rule of the device controlled by electrochemistry provided by another typical embodiment of the present application under different electrolyte contents.

This example 6 disclosed a device that achieved reversible switching of multiple colors through electrical regulation, including a color-changing layer (a substrate, a conductive layer, and an active material layer), an electrolyte, and a counter electrode layer, which were assembled side by side to form the device, as shown in FIG. 2. Optical photographs of the single device under different total ion concentrations were shown in FIG. 6.

A method for preparing the device that achieved reversible switching of multiple colors through electrical regulation in this example was as follows: depositing a conductive layer on clean and transparent glass. Preferably, one layer of Ag was sputtered by magnetron with a preferred Ag thickness of 200 nm. A Pt sheet was selected as the counter electrode, and was assembled side by side into the device; a liquid electrolyte was injected between the two electrodes, and preferably, the liquid electrolyte contained a plurality of components: $CuCl_2$, $ZnCl_2$, $H_2SO_4$. A working electrode and the counter electrode were connected to the two poles of an electrochemical workstation respectively. A given voltage, preferably set to be 1.5 V, was applied to control the response time of color transition by changing the ion concentration in the electrolyte of the device, and to obtain active materials of different thicknesses on the conductive layer, thereby obtaining a device with multiple color changes. By preparing a device with a variety of ion concentrations, it was found that the ion concentration was in the range of 0.1-0.5 M, and it still had no significant impact on the color-changing range and it mainly affected the color-changing speed.

Of course, the aforementioned conductive Ag film could also be prepared by methods known in the art such as electron beam evaporation and thermal evaporation. The obtained color change effect and the rule in influence of the total ion concentration were the same.

Based on the aforementioned examples, it can be explicitly understood that the examples of the present application provide a method for preparing a device that realizes reversible switching of multiple colors through electrical regulation, which is suitable for fields of displaying, decoration, anti-counterfeiting, batteries or energy-saving building materials. Colorful changes in the device are achieved by externally applying a small voltage. The change process is reversible and has certain memory retention characteristics. That is, the color can still be maintained without external voltage or energy input, which not only meets people's demand for color, but also achieves high-quality energy-saving display, and has broad application prospects in the field of static display.

It should be understood that the aforementioned embodiments only illustrate the technical concept and characteristics of the present application, and their purpose is to enable those skilled in the art to understand the content of the present application and implement it accordingly, but not to limit the claimed scope of the present application. All equivalent changes or modifications made according to the spiritual essence of the present application shall be encompassed within the claimed scope of the present application.

What is claimed is:

1. A full-color reversible switching device controlled by electrochemistry, comprising a color-changing layer and an electrolyte;
    wherein the color-changing layer comprises a substrate, a conductive layer and an active material layer, and the active material layer and the conductive layer or the substrate layer forms optical interference to produce a structural color;
    the electrolyte is connected to the conductive layer or the active material layer, and_in response to an electrochemical reaction occurring between the electrolyte and a surface of the conductive layer or the active material layer, a thickness of the active material layer changes such that the change in the thickness of the active material layer directly effects a color change of said structural color.

2. The device controlled by electrochemistry according to claim 1, further comprising a counter electrode electrically connected to the electrolyte;
    wherein the counter electrode and the color-changing layer are stacked along a thickness direction or juxtaposed along a width direction; and
    the counter electrode is transparent or translucent.

3. The device controlled by electrochemistry according to claim 1, wherein a plurality of cations are included in the electrolyte;
    at least two cations are included in the electrolyte; and/or the cations in the electrolyte comprise any one or a combination of two or more of $H^+$, $Li^+$, $Al3^+$, $Na^+$, $K^+$, $Rb^+$, $Ag^+$, $Ni^{2+}$, $Ca^{2+}$, $Mo^{6+}$, $Mn^{2+}$, $Ti^{4+}$, $V^{4+}$, $Zn^{2+}$, $W^{6+}$, $Ta^{5+}$, $Cu^{2+}$, $Bi^{3+}$, $Sn^{4+}$, $Mg^{2+}$, $Cs^+$.

4. The device controlled by electrochemistry according to claim 3, wherein the electrolyte comprises a zinc salt compound;
    the zinc salt compound comprises any one or a combination of two or more of $Zn(ClO_4)_2$, $Zn(NO_3)_2$, $ZnSO_4$, $ZnCl_2$ or $Zn(Ac)_2$; and
    the electrolyte is in a liquid, gel or solid state.

5. The device controlled by electrochemistry according to claim 1, wherein a material of the active material layer comprises any one or a combination of two or more of a metal oxide, a metal, and a polymer; and
    the material of the active material layer comprises any one or a combination of two or more of $ZnO$, $MnO_2$, $MoO_3$, $WO_3$, $Fe_3O_4$, $Fe_2O_3$, $NiO$, $VO_2$, $V_2O_5$, $TiO_2$, $CuO$, $Cu_2O$, $Al_2O_3$, $Ta_2O_5$, $Ag_2O$, Ag, Cu, Al, Ni, Zn, Bi, Au, Pt, polyaniline, polythiophene, and polypyrrole.

6. The device controlled by electrochemistry according to claim 1, wherein a material of the conductive layer comprises any one or a combination of two of metal and non-metal conductive materials; and
    the material of the conductive layer comprises any one or a combination of two or more of Cu, Ag, W, Ti, V, Fe, Cr, Ni, Zn, Al, Mo, Au, Pd, Co, Ta, Pt, Mg, a carbon material, a conductive metal oxide and a conductive polymer material.

7. The device controlled by electrochemistry according to claim 1, wherein a structure of the conductive layer is any one of a one-dimensional film, a two-dimensional photonic crystal, a three-dimensional photonic crystal or a nanoparticle; and/or
    a thickness of the conductive layer is 0-1 cm.

8. The device controlled by electrochemistry according to claim 1, wherein a structure of the active material layer is any one of a one-dimensional film, a two-dimensional photonic crystal, a three-dimensional photonic crystal or a nanoparticle; and/or
    the thickness of the active material layer is 0-1 mm.

9. A method for regulating a color of a device controlled by electrochemistry, comprising
    providing the device controlled by electrochemistry according to claim 1; and
    applying a voltage between the conductive layer and the electrolyte, and allowing the device controlled by electrochemistry to present different colors by adjusting an application time of the applied voltage.

10. The method for regulating the color according to claim 9, further comprising
    applying a reverse voltage between the conductive layer and the electrolyte, so as to reversibly restore the color presented by the device controlled by electrochemistry.

11. The method for regulating the color according to claim 9, wherein the applied voltage is below 6 V.

12. The method for regulating the color according to claim 9, wherein the application time is 0-160 s.

13. The method for regulating the color according to claim 12, wherein by adjusting the application time, the color that can be presented by the device controlled by electrochemistry comprises any one of red, orange, yellow, green, blue, indigo, and violet.

14. The method according to claim 9, wherein the device further comprises a counter electrode electrically connected to the electrolyte;
    wherein the counter electrode and the color-changing layer are stacked along a thickness direction or juxtaposed along a width direction; and the counter electrode is transparent or translucent.

15. The method according to claim 9, wherein in the device, a material of the active material layer comprises any one or a combination of two or more of a metal oxide, a metal, and a polymer; and the material of the active material layer comprises any one or a combination of two or more of ZnO, $MnO_2$, $MoO_3$, $WO_3$, $Fe_3O_4$, $Fe_2O_3$, NiO, $VO_2$, $V_2O_5$, $TiO_2$, CuO, $Cu_2O$, $Al_2O_3$, $Ta_2O_5$, $Ag_2O$, Ag, Cu, Al, Ni, Zn, Bi, Au, Pt, polyaniline, polythiophene, and polypyrrole.

16. The method according to claim 9, wherein in the device, a material of the conductive layer comprises any one or a combination of two of metal and non-metal conductive materials; and the material of the conductive layer comprises any one or a combination of two or more of Cu, Ag, W, Ti, V, Fe, Cr, Ni, Zn, Al, Mo, Au, Pd, Co, Ta, Pt, Mg, a carbon material, a conductive metal oxide and a conductive polymer material.

17. The method according to claim 9, wherein the electrolyte, the conductive layer and the active layer are configured such that different thicknesses produced by different electrochemical reactions occurring between the electrolyte and the surface of the conductive layer or the active material layer respectively produce seven different full colors by the device.

18. Use of the device controlled by electrochemistry according to claim 1 in any field of display, decoration, anti-counterfeiting, batteries, and energy-saving building materials.

19. The device controlled by electrochemistry according to claim 1, wherein the electrolyte, the conductive layer and the active layer are configured such that different thicknesses produced by different electrochemical reactions occurring between the electrolyte and the surface of the conductive layer or the active material layer respectively produce seven different full colors by the device.

20. A method for preparing a device controlled by electrochemistry, comprising forming a conductive layer on a substrate;

bringing an electrolyte into contact with the conductive layer, and forming an active material layer between the electrolyte and the conductive layer through electrochemical deposition to constitute the device controlled by electrochemistry;

or alternatively, forming the active material layer on a surface of the conductive layer, and then bringing the electrolyte into contact with the active material layer to constitute the device controlled by electrochemistry, wherein the active material layer and the conductive layer or the substrate forms optical interference to produce a structural color and wherein, in response to a reaction occurring between the electrolyte and the surface of the conductive layer or the active material layer, a thickness of the active material layer changes such that the change in the thickness of the active material layer directly effects a color change of said structural color.

* * * * *